Jan. 13, 1959   M. J. PERRY ET AL   2,868,560
FIFTH WHEEL SLIDE MOUNT

Filed April 10, 1957   2 Sheets-Sheet 1

INVENTORS.
MARK J. PERRY & SAMUEL H. CAPPS
BY
*George H. Baldwin*
ATTORNEY

Jan. 13, 1959   M. J. PERRY ET AL   2,868,560
FIFTH WHEEL SLIDE MOUNT
Filed April 10, 1957   2 Sheets-Sheet 2

INVENTORS.
MARK J. PERRY & SAMUEL H. CAPPS
BY
George H. Baldwin
ATTORNEY

United States Patent Office 2,868,560
Patented Jan. 13, 1959

2,868,560

FIFTH WHEEL SLIDE MOUNT

Mark J. Perry and Samuel H. Capps, Jacksonville, Fla.

Application April 10, 1957, Serial No. 651,919

10 Claims. (Cl. 280—407)

This invention pertains to fifth wheel slide mounts for semi-trailers.

A general object of the invention is to provide an improved fifth wheel slide mount for semi-trailers.

It is desirable that the overall length of semi-trailers, and the division of weight between the axles thereof, be readily adjustable, particularly if the semi-trailer is to be used in interstate commerce, in order to comply with the differing laws of adjoining states with respect to length and axle loading while transporting a load of maximum weight. It has been heretofore suggested that the fifth wheel be movable or slideable on the tractor for adjusting the attachment point of the trailer and tractor.

This invention has for its objects the improving of sliding fifth wheel mounts by providing for attachment of the mount to the tractor without weakening or appreciable modification of the tractor frame, by providing a mount adapted for attachment to any of a number of different tractors of different manufacturers without interference between parts of the mount and parts of the tractor, by providing an arrangement wherein the fifth wheel position may be adjusted by the driver without leaving the tractor cab, by increasing the strength and the number of adjustment steps of the mount, by simplifying the construction of the mount, by providing increased overall adjustment distance from maximum forward to maximum rearward position of the fifth wheel and by providing a positive cage or enclosure in which a fifth wheel mounting plate may slide during adjustment but from which such plate cannot escape.

According to the invention, a fifth wheel mounting plate of generally rectangular configuration is slideably disposed in a larger rectangular frame or enclosure, and a movable blade divides the enclosure into compartments, the plate being proportioned to be housed or caged in one or another of the compartments. The invention further contemplates a mounting plate slideable in an enclosure, the plate having slots therein and a blade being arranged to engage selectively in one or another of the slots to retain the plate in any one of several selectable positions.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Figure 1:
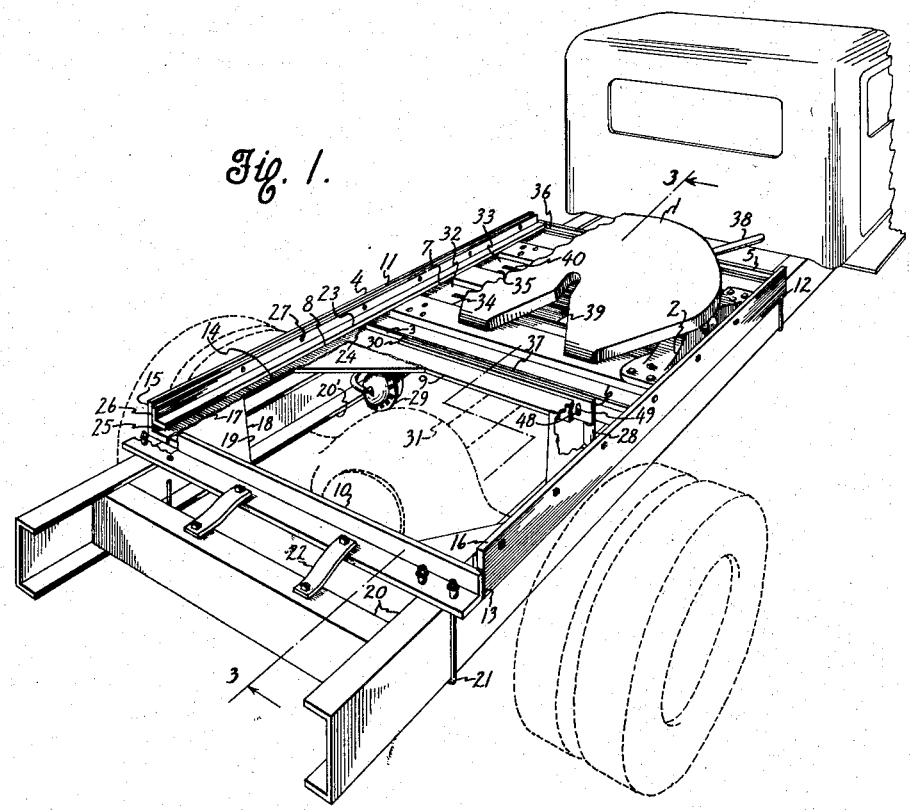
Fig. 1 is a perspective view of a fifth wheel mount in accord with the invention, attached to the bed or frame of a tractor, portions being broken away.

As shown in Fig. 1, a fifth wheel 1 is mounted by means of the usual pivot stanchions, such as at 2, to a rectangular slideable plate 3. The plate 3 is disposed within an open top enclosure or enclosing frame 4 from which it cannot escape, unless some part of the frame is detached, but in which the plate may slide in a forward and rearward direction. Plate 3 is shown in Fig. 1 in its extreme or maximum forward position being firmly held in such position against a forward frame wall member 5 by a vertical blade 6 which divides the enclosure 4 into two equal compartments, including forward compartment 7 in which the plate is shown positioned and the similarly proportioned rearward compartment 8 into which the plate can slide when blade 6 is retracted into bed plate or base 9 of frame 4.

Frame 4 is assembled by welding angle iron end wall members 5 and 10 to angle iron side frame members 11 and 12, respectively, as by weld 13. The side frame members have inwardly extending horizontal flanges, such as flange 14 of member 11, and vertical flanges 15 and 16 which comprise the side walls of the frame. The horizontal flanges are joined such as by weld 17 to suitable plate elements, such as plate element 18, to form the flat base generally identified at 9. The portion 18 of the base serves as a gusset between frame members 10 and 11 and the base otherwise imparts rigidity and strength to the frame. Preferably, the base is not solid but is cut out or apertured as at 19, whereby weight is saved. While the horizontal side member flanges serve to support the movable plate 3 for sliding therealong, the other base portions, such as portion 18, are preferably flush with the flanges and also constitute a support on which the plate may slide.

The frame 4 is connected to the bed frame members 20 of the tractor by means of U bolts, such as bolt 21, and if desired, by bolted straps such as strap 22 utilizing such bolt openings as may be available in the tractor bed, whereby no weakening of the tractor frame results from attachment of the frame thereto.

Each side wall of the frame is provided with an inwardly extending flange, such as flange 23, which is spaced above the horizontal flange 14 and which overhangs the side edge 24 of plate 3, forming a side groove 25 along which the plate can slide but from which it cannot escape. Flange 23 conveniently comprises a portion of an angle member 26 bolted by bolts 27 to side wall 11, and it will be understood that this construction is duplicated with respect to side wall 12.

As shown in Fig. 1, plate 3 is disposed within forward compartment 7 of the frame, as defined forwardly of blade 6. Mechanism is provided by means of which blade 6 may be retracted vertically downwardly into the bed or base 9, but the blade is normally retained in the raised positions shown by means of compression springs housed in casing cylinders, such as cylinder 28. The blade lowering mechanism includes a fluid motor in the form of hydraulic, i. e. air cylinder 29 and other elements later described. The cylinder 29 is located adjacent and below side wall member 11, inwardly of and adjacent tractor frame girder 20', and adjacent and below end 30 of the blade, in a position completely free of interference with or by the differential housing and other portions of the tractor such as are indicated by broken lines at 31.

It will be noted in Fig. 1 that the plate 3 is formed, to impart rigidity thereto, into a series of flat corrugations with alternating depressed portions, such as portions 32 and 33, which contact flange 14, and raised portions 34 and 35, while end edge strength is provided by upturned lips 36 and 37 at the forward and rearward plate edges.

Handle 38 operates suitable known means for completing the hitch of the trailer body to the fifth wheel 1.

Figure 2:
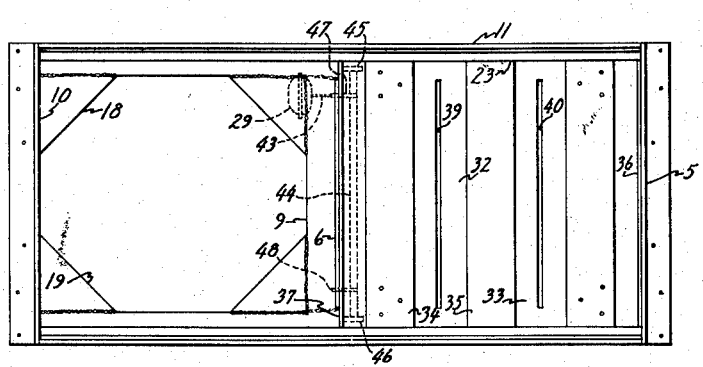
Fig. 2 is a top plan view of the frame and fifth wheel mounting plate portions of the assembly of Fig. 1, certain elements being omitted for clarity.

Retraction of the blade 6 has the effect of connecting the two compartments and permits the plate to slide rearwardly from its Fig. 1 position. The plate may slide all of the way rearwardly, until edge 37 thereof contacts rear end frame wall 10, and, upon the plate reaching this rearward position, the blade may be permitted to rise and to project above the base 9 immediately forwardly of the plate edge 36, whereby the plate will then be caged securely in the rearward compartment 8. Alternatively, the plate may be locked in either one of two intermediate positions, in the construction shown, there being, as best seen in Fig. 2, two elongated slots 39 and 40 formed in the plate, each slot being proportioned fittingly to receive blade 6. Each of slots 39 and 40 is parallel to the plate ends 36 and 37 and each extends laterally across at least about three-quarters of the plate breadth and is located in a respective one of the depressed portions 32 and 33 of the plate. Slot 39 is spaced by a distance equal to one-third of the plate length from end edge 37, and slot 40 is disposed midway between slot 39 and end edge 36. Accordingly, the plate may be locked in any one of four selectable positions, and, if the plate is two feet long from edge 37 to edge 36, these positions include the extreme forward position, a first intermediate position approximately eight inches rearwardly of the forward position, a second intermediate position approximately sixteen inches rearwardly of the forward position, and finally the extreme rearward position approximately two feet rearwardly of the forward position.

As further seen in Fig. 2, in broken lines, hydraulic cylinder 29 is coupled by piston rod 43 to a transverse actuating shaft 44 for the blade, shaft 44 extending from side to side of and underlying base 9 of the frame and being supported in stationary bearings at 45 and 46. Levers 47 and 48 are fixed to and extend laterally from shaft 44 adjacent the respective ends of the blade and engage in respective sockets in the blade. Lever 47 engages in socket 49, for example, as best seen in Fig. 1, while lever 48 is seen to engage in socket 50 adjacent blade end 30 in Fig. 4 as later described.

Figure 3:
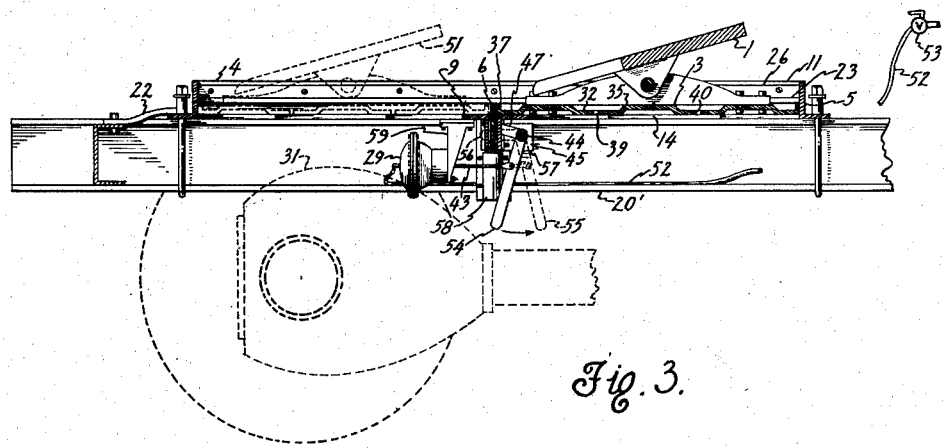
Fig. 3 is a sectional side elevation taken generally along line 3—3 of Fig. 1.

Referring particularly to Fig. 3, the fifth wheel and its mounting plate are shown in full lines in forward position and are represented in broken lines at 51 in extreme rearward position. As explained, retraction of blade 6 permits the plate 3 to move slideably between these extreme positions, depressed portions, such as portions 32 and 33, of the plate being engaged on flange 14 and on other portions of base 9, while the raised portions 34 and 35 approach to within a free sliding clearance distance of plate hold down flange 23.

Blade 6 is retractible by supplying hydraulic fluid, such as oil under pressure or compressed air or vacuum as is desired, through tube or line 52 from a suitable control valve 53 which is disposed in the cab of the tractor conveniently accessible to the driver. Actuation of the cylinder 29 accomplished by operation of valve 53 causes rod 43 to move in a forward direction to swing lever 54 from its full line position into its broken line position at 55 thereby to rotate shaft 44 in the direction to lower lever 47 from its full line position to its broken line position 56. It will be understood that levers 54 and 47, and the lever 48 which corresponds to lever 47 but which is arranged at the opposite end of shaft 44, are all rigidly and permanently fixed to shaft 44. As previously explained, lever 47 engages in a socket in blade 6 and the downward swinging motion of this lever, into position 56 shown in broken lines, causes blade 6 to be moved downwardly against the biasing force of compression spring 57, thereby to retract blade 6 into base plate 9 of the frame. Retraction of blade 6 permits lip 37 and the body of plate 3 to pass freely forwardly and rearwardly in the frame. If the valve 53 is closed at a time when slot 39 is disposed in alignment with blade 6, the compression spring 57 will force the blade 6 upwardly to engage in slot 39, thereby to lock plate 3 in the corresponding intermediate position thereof. The blade may be similarly released into slot 40 to lock the plate in its other intermediate position, or the plate may slide into its full rearward position, indicated in broken lines, and may be there held in position by the blade as will be readily apparent.

Spring 57 is housed in a cylinder 58 having a closed bottom and suitably secured to the frame 4. Bracket 59 is provided to attach the cylinder 29 to the frame, and member 45, which is fixed to the frame, provides a bearing to support shaft 44. Lever 54 preferably extends below the bed frame girder 20' of the tractor a sufficient distance to permit manual grasping of the lever, permitting manual lowering of the blade 6 in case of any failure of the hydraulic system, such as valve 53, line 52 or cylinder 29.

Figure 4:
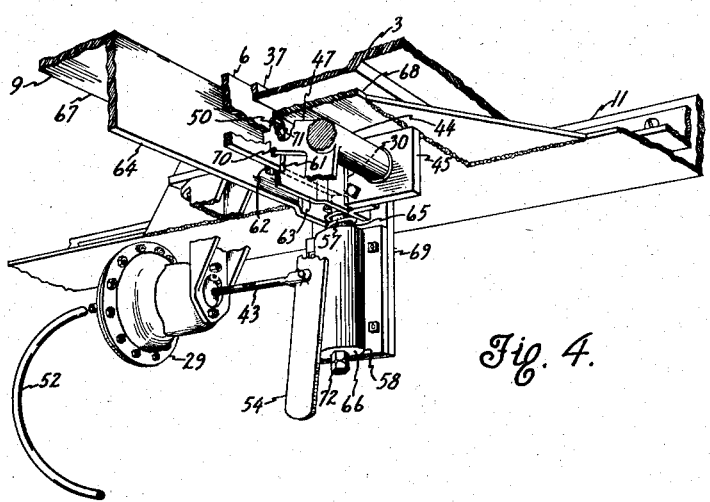
Fig. 4 is a fragmentary perspective view on enlarged scale, taken from below and looking toward the rear, showing details of certain portions of the assembly, including particularly the mechanism for operating the plate-anchoring blade and the associated parts.

Further details of the blade arrangement, including its operating mechanism, will be apparent in Fig. 4, wherein lever 47 is seen to be fittingly engaged in socket 50 of blade 6, passing through suitable slots 61 and 62 in the respective vertical transverse flanges 63 and 64 which confine the blade. Slots 61 and 62 are each of greater height, i. e. longer, than socket 50. The blade is shown in the raised position in which it is normally held by compression spring 57, and by the corresponding spring in housing 28 shown in Fig. 1. A guide post 65 which is preferably attached to blade 6 extends downwardly a short distance from the blade into the center of spring 57 and into spring housing 58, moving downwardly toward the closed bottom 66 of the cylinder as the blade is lowered. Housing 58 and post 65 cooperate to retain the spring 57 in operative alignment with the blade at all times. Bearing member 45 for shaft 44 is seen to be fixed to flange 63 and the flanges 63 and 64 are fixed to appropriate portions 67 and 68 of the frame base 9. A support 69 for housing 58 is similarly fixed to the base of the frame.

The lower end 70 of the blade socket 50 engages against lever 47 at all times, being held thereagainst by the force of spring 57. The upwardly travel of blade 6 is limited by engagement of lever 47 with either the upper end 71 of slot 61 or the corresponding portion of slot 62, which is not visible in the drawing, or by engagement of the lever 47 with the base 9 of the frame, or the travel distance in an upward direction of lever 47 may be limited within cylinder 29 by a stop which limits the forward movement of rod 43. Blade 6 should be permitted to move upwardly to at least substantially the full height of lip 37 of plate 3, while the downward or retracting movement of blade 6 should bring it completely below the level of base 9. Spring pressure adjustment means such as indicated at 72 may be provided for each spring housing.

As explained above, the blade-engaging levers 47 and 48 are arranged near opposite ends of shaft 44 and, when shaft 44 is rotated by cylinder 29, balanced force is exerted by these two levers near the opposite ends of the blade, and near the balanced springs which are also disposed near the opposite ends of the blade. Thus, though cylinder 29 is disposed far to one side of the center of the frame, the forces on the blade are balanced and tilting of the blade is prevented.

The operation of the device will be apparent from the above description, and it will be seen that the fifth wheel is adjustable in a frame having an overall length very little more than twice the adjustment distance permitted. In other words, if the plate 3 is 24 inches long, it may be moved rearwardly from its forward position through a distance of about 24½ inches, assuming the thickness of blade 6 to be ½ inch, while the full length of the side wall members 11 and 12 would then be 48½ inches, and the overall length of the frame about 53 inches depending upon the specific dimensions of the end wall members 5 and 10.

Since valve 53 is mounted in the cab, it is possible to stop the semi-trailer, to operate the valve 53, thereby lowering blade 6, and then by driving the tractor forwardly or rearwardly, to cause plate 3 to slide in its frame until it reaches its proper position. Thereafter, release of the blade will permit it to return upwardly to lock the plate in position. Specifically, if it is desired to move the plate from its forward position to an intermediate position, in which the blade would engage slot 39, for example, the blade may be retracted from the cab, the tractor operated to bring the plate into approximately correct position, with slot 39 positioned slightly forwardly of the blade, for example, then to release the blade and thereafter to drive the tractor slowly forward. The plate, to which the trailer would be attached, would tend to remain stationary and the plate would move rearwardly in the frame until slot 39 aligned with the blade, at which time the blade would snap into slot 39 to lock the plate securely in position.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A fifth wheel mount for a tractor comprising a rectangular frame having a flat base adapted to lie upon and to be attached to the bed of said tractor, said frame having side walls and a front and a rear wall extending upwardly from said base defining an open top enclosure, a rectangular plate fitted between said side walls, resting on said base and slideable forwardly and rearwardly in said enclosure, said base having a slot disposed midway between and parallel to said front and rear walls, a vertical blade disposed in said slot having an upper portion projecting upwardly above said base into said enclosure dividing said enclosure into equal forward and rearward compartments, said plate having substantially the plan shape and size of each said compartment to fit closely therein, selectively operable means to retract said blade downwardly into said slot thereby to free said plate for sliding forwardly and rearwardly from one to the other of said compartments and to return said blade upwardly to cage said plate in one or the other of said compartments, and a fifth wheel attached to said plate.

2. The combination according to claim 1 wherein said means comprise a spring urging said blade upwardly and a fluid motor coupled to said blade for forcing said blade downwardly against the force of said spring.

3. The combination according to claim 1 wherein said plate has a slot therein parallel to said end walls and spaced between the forward and rearward edges of said plate and proportioned fittingly to receive said upper portion of said blade when said plate is disposed in an intermediate position between said forward and rearward positions thereof and when said blade is so extended.

4. The combination according to claim 1 wherein inwardly extending flanges are provided on said side walls, said flanges overhanging the side edge portions of said plate to retain the plate within said enclosure.

5. A fifth wheel mount for a tractor comprising a rectangular frame with a flat base adapted for disposition on the bed of the tractor and with upstanding parallel side and parallel end walls on corresponding edges of said base, a blade slot in said base extending parallel to said end walls and spaced midway therebetween, a blade in said slot dividing said frame into respectively equal forward and rearward rectangular compartments, a rectangular plate member slideably resting on said base, said plate having side edges respectively adjacent said side walls and a forward and a rearward edge, said plate being proportioned substantially to fill one and the other of said compartments, said forward and rearward edges being spaced by a distance equal to the distance from said blade to each said end wall, means for projecting said blade upwardly to extend above the level of said base and selectively for retracting said blade downwardly into said slot, and a fifth wheel disposed above said plate and mounted thereto, said plate being retained between said side walls, and being freely slideable when said blade is retracted from a forward position against the forward one of said end walls to a rearward position against the rearward one of said end walls and said blade being effective when projected upwardly to complete said compartments and to cage said plate in the selected one of said compartments against movement toward the other compartment.

6. A fifth wheel mount for a tractor comprising a pair of coextensive angle iron members disposed in spaced parallel relation overlying and attached to respective side frame members of said tractor, said angle members having inwardly directed horizontal flanges and upwardly directed vertical flanges, end members extending between respective ends of said vertical flanges defining therewith a rectangular enclosure, a rectangular plate in said enclosure resting on and slideable along said horizontal flanges, said plate having side edges guidedly engaging said respective vertical flanges and having a length less than one half of the length of said enclosure between its said end members, a bed plate on a level with, joined to and extending between said horizontal flanges, said bed plate having an elongated slot therethrough, said slot being located parallel to said end members and a distance from the front end of said end members equal to said length dimension of said rectangular plate, a blade fitted in said slot and extending above said level, said blade having stop means below said bed plate in engagement therewith, a pair of compression springs engaging said blade and forcing said blade upwardly through said slot maintaining said stop means in engagement with said bed plate, a respective cylindrical housing for each said spring, each said housing having a closed bottom supporting the respective spring, said housings being mounted to said bed plate, a shaft parallel to and adjacent a face of said blade under said bed plate, a pair of arms spaced along, fixed to and extending laterally from said shaft, said blade having respective sockets adjacent its ends receiving said arms respectively, a lever fixed to and extending laterally from said shaft adjacent one end of said blade, a hydraulic cylinder having a piston rod linked to said lever and operative to rotate said shaft and arms in a direction to force said blade downwardly against the force of said springs and thereby to retract said blade into said slot, said cylinder being positioned under the side of said enclosure and adjacent the side frame member of said tractor which are closest to said one blade end, a respective retaining flange extending inwardly from each said vertical flange above said rectangular plate retaining said plate against upward movement out of said enclosure, and a fifth wheel mounted on said rectangular plate.

7. A fifth wheel mount for a tractor comprising a pair of coextensive angle iron members disposed in spaced parallel relation overlying and attached to respective side frame members of said tractor, said angle members having inwardly directed horizontal flanges and upwardly directed vertical flanges, end members extending between respective ends of said vertical flanges defining therewith a rectangular enclosure, a rectangular plate in said enclosure resting on and slideable along said horizontal flanges, said plate having side edges guidedly engaging said respective vertical flanges and having a length less than one half of the length of said enclosure between its said end members, a bed plate on a level with, joined to and extending between said horizontal flanges, said bed plate having an elongated slot therethrough, said slot being located parallel to said end members and a distance from the front one of said end members equal to said length dimension of said rectangular plate, a blade fitted in said slot and extending above said level, said blade having stop means below said bed plate in engagement therewith, a pair of compression springs engaging said blade and forcing said blade upwardly through said slot maintaining said stop means in engagement with said bed plate, a respective cylindrical housing for each said spring, each said housing having a closed bottom supporting the respective spring, said housings being mounted to said bed plate, a shaft parallel to and adjacent a face of said blade under said bed plate, a pair of arms spaced along, fixed to and extending laterally from said shaft, said blade having respective sockets adjacent its ends receiving said arms respectively, a lever fixed to and extending laterally from said shaft adjacent one end of said blade, a hydraulic cylinder having a piston rod linked to said lever and operative to rotate said shaft and arms in a direction to force said blade downwardly against the force of said springs and thereby to retract said blade into said slot, said rectangular plate having a series of parallel slots spaced therealong, each parallel to said end members and each proportioned and adapted to receive said blade as it projects above said bed plate, whereby said blade retains said rectangular plate selectively in its forwardmost position when raised behind the rearward end of the plate or in a predetermined selected intermediate position when said blade is extended into a selected one of said slots of said rectangular plate, said cylinder being positioned under the side of said enclosure and adjacent the side frame member of said tractor which are closest to said one blade end, a respective retaining flange extending inwardly from each said vertical flange above said rectangular plate retaining said plate against upward movement out of said enclosure, and a fifth wheel mounted on said rectangular plate.

8. A fifth wheel mount for a tractor comprising a rectangular frame with a flat base adapted for disposition on the bed of the tractor and with upstanding parallel side and parallel end walls on corresponding edges of said base, a blade slot in said base extending parallel to said end walls and spaced midway therebetween, a blade in said slot dividing said frame into respectively equal forward and rearward rectangular compartments, a rectangular plate member slideably resting on said base, said plate having side edges respectively adjacent said side walls and a forward and a rearward edge, said plate being proportioned substantially to fill one and the other of said compartments, said forward and rearward edges being spaced by a distance equal to the distance from said blade to each said end wall, means for projecting said blade into an upwardly projected position extending above the level of said base and selectively for retracting said blade downwardly into said slot, said blade having a portion extending downwardly below said base when the blade is in its said upwardly projected position, said means comprising an elongated element rotatably mounted below said base for rotation about an axis longitudinally of the element and generally parallel to said base and generally parallel to and spaced from said blade, a pair of arms fixed to said element and extending in parallel spaced relation laterally thereof and being coupled to points spaced toward the ends of said blade, spring means for rotating said element about its said axis in one direction, and fluid motor means for rotating said element in the opposite direction against the force of said spring means, and a fifth wheel disposed above said plate and mounted thereto, said plate being retained between said side walls and being freely slideable when said blade is retracted from a forward position against the forward one of said one walls to a rearward position against the rearward one of said end walls and said blade being effective when projected upwardly to complete said compartments and to cage said plate in the selected one of said compartments against movement toward the other compartment.

9. The combination according to claim 8 wherein said plate has a slot therein spaced between said forward and rearward edges thereof and parallel thereto and proportioned fittingly to receive said blade when said plate is disposed in an intermediate position between said forward and rearward compartments with its said slot aligned above said blade slot and when said blade is projected into its said upwardly projected position.

10. The combination according to claim 8 wherein said blade is projected upwardly in response to rotation of said element in said one direction and is retracted into said base slot in response to rotation of said element in said opposite direction.

References Cited in the file of this patent
UNITED STATES PATENTS

| | | |
|---|---|---|
| 2,317,508 | Zoder | Apr. 27, 1943 |
| 2,750,207 | Greenway | June 12, 1956 |
| 2,776,846 | Willock | Jan. 8, 1957 |